UNITED STATES PATENT OFFICE.

ANTON MESSERSCHMITT, OF STOLBERG, GERMANY.

METHOD FOR EXTRACTING POTASSIUM AND SODIUM COMPOUNDS FROM SILICATES WHICH CONTAIN ALKALIS.

1,091,230.  Specification of Letters Patent.  Patented Mar. 24, 1914.

No Drawing.  Application filed March 1, 1912.  Serial No. 680,987.

*To all whom it may concern:*

Be it known that I, ANTON MESSERSCHMITT, a subject of the German Emperor, residing in the city of Stolberg, Rhine Province, Germany, have invented new and useful Improvements in Methods for Extracting Potassium and Sodium Compounds from Silicates which Contain Alkalis, of which the following is a specification.

This invention relates to a method for extracting potassium and sodium compounds from silicates which contain alkalis.

An object of the invention is to utilize calcium carbonates, mainly in the form of by-products resulting from soda manufacturing processes, for this method, said by-products having not been utilized heretofore.

Another object of the invention is to extract the aforementioned compounds from calcium carbonate in finely divided conditions, said carbonate being obtained in this condition mainly as by-products in soda manufacturing processes.

Another object of the invention is to save the expense incidental to preparatory operations on the raw material; as the raw material, which forms the basis of the method, does not require any additional crushing, grinding or pulverizing.

Another object of the invention is to increase the output of the method compared with known methods for extracting the aforementioned compounds from silicates.

Other objects will be more fully understood by reference to the following specification and will be pointed out in and by the appended claims.

The basis of the method is calcium carbonate in finely divided condition. This material may preferably be obtained in processes for the manufacture of sodium hydroxid or soda-ash. When sodium carbonate is treated with calcium hydroxid a paste or slime is obtained which contains calcium carbonate and sodium hydroxid. The latter is withdrawn therefrom by filtering or similar methods, leaving the calcium carbonate in finely divided condition. Again in the Leblanc process for the manufacture of soda, which is based upon sodium chlorid as starting material, one of the by-products is calcium sulfid and sodium carbonate. These by-products are utilized in the Chance-Clauss process, wherein they are carbonized to form calcium carbonate and hydrogen sulfid. In this process the calcium carbonate also is obtained in the form of a slime or paste. The present method preferably makes use of this slime for the purpose of extracting potassium or sodium compounds from minerals which contain alkalis.

In the following a description of one way for performing the method will be given by way of example.

The silicates are added in pulverized form to the slime, containing the calcium carbonate in finely divided condition and a large amount of water. A plastic mixture is obtained thereby and this mixture is thoroughly kneaded, until the silicate powder is uniformly distributed through the entire mixture. The alkalis or alkali compounds then are freed from this mixture by glowing the mixture and by lixiviation.

The slime of calcium carbonate could not be utilized heretofore on account of the large quantity of water contained therein. The water, amounting sometimes to fifty per cent. of the weight of the slime, could not be withdrawn therefrom, even when suction filters were used for this purpose. Attempts have been made to dry the slime, but they proved futile, as they were either attended with great difficulties or were too expensive. Experiments for utilizing the slime for other purposes were not successful on a commercial scale, or could only be of importance in territories in which lime is considered an expensive material.

The described method shows great advantages over known methods for freeing alkalis from silicates, like feldspar, mica, leucite, phonolites, trass and such like, by glowing the same with lime or limestone. If these last named materials are to be used, they must be crushed and ground to a very fine powder-like dust. This dust must be mixed with the silicates which also have to be ground. This method is extremely expensive, not only on account of the grinding and pulverizing operations which requires large plants, but also on account of the high prices for the lime or limestone.

The slime, resulting as by-product from the above described soda processes, however, is useless for almost any other purpose and therefore it may be stated that the calcium carbonate utilized for the present method does not cost anything. The expensive crushing, grinding and pulverizing operations may be dispensed with entirely, for the calcium carbonate is here in the form of a precipitate and it is a well known fact that precipitates are much finer powders than can be obtained in mechanical grinders. Furthermore, the presence of water is of great advantage in the described method, for it is desirable to get a plastic mass which can readily be kneaded for the purpose of distributing the added silicates uniformly throughout the mixture; it is obvious that this plastic mass can be shaped readily into the form of briquets, sticks or the like to facilitate handling, shipping and other operations. This extreme fineness of the precipitated calcium carbonate and the uniform distribution thereof also result in a larger output, compared with the utilization of crushed lime.

The slime resulting from the manufacture of caustic-soda (lye) or from the carbonizing process according to Chance-Clauss, very often contains large amounts of soda-ash (soda, sodium carbonate). As the slime heretofore was considered as an obnoxious waste product, the advantage obtained by the present method is still enhanced. This slime includes sometimes large amounts of soda. This soda, not only influences favorably the decomposition of the silicates, but it may also be freed by the present method and regained from the slime. The slime is likely to contain other impurities, but tests have shown that they will not react unfavorably, so as to disurb the operations. The slime resulting from the Chance-Clauss process contains, for instance, sulfur. In lixiviating the entire mass the sulfur combines with the lime, or at least a very large part thereof enters into combination with the lime, without exerting any detrimental effect.

I claim:

1. The process of producing soluble sodium and potassium compounds from silicates containing alkalis, which comprises thoroughly incorporating the finely powdered silicates with undried precipitated calcium carbonate, and heating the mixture to the decomposing temperature.

2. The process of producing soluble sodium and potassium compounds from silicates containing alkalis, which comprises thoroughly incorporating finely powdered silicates with the slime containing undried precipitated calcium carbonate resulting from a soda manufacturing process, heating the mixture to the decomposing temperature, and lixiviating.

In testimony whereof I affix my signature in presence of two witnesses.

ANTON MESSERSCHMITT.

Witnesses:
  HENRY QUADFLIEG,
  ELIZE KOLBUSCH.